US012747187B2

(12) United States Patent
Barres et al.

(10) Patent No.: US 12,747,187 B2
(45) Date of Patent: Sep. 29, 2026

(54) MATERIAL COATED WITH A FUNCTIONAL COATING COMPRISING A HIGH-INDEX LAYER

(71) Applicant: SAINT-GOBAIN GLASS FRANCE, Courbevoie (FR)

(72) Inventors: Thomas Barres, Aubervilliers (FR); Alexandra Toumar, Courbevoie (FR); Véronique Rondeau, Aubervilliers (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 99 days.

(21) Appl. No.: 18/711,455

(22) PCT Filed: Nov. 18, 2022

(86) PCT No.: PCT/FR2022/052120

§ 371 (c)(1),
(2) Date: May 17, 2024

(87) PCT Pub. No.: WO2023/089282

PCT Pub. Date: May 25, 2023

(65) Prior Publication Data

US 2025/0019297 A1 Jan. 16, 2025

(30) Foreign Application Priority Data

Nov. 19, 2021 (FR) .................................... 2112288

(51) Int. Cl.
*C03C 17/36* (2006.01)
*C03C 3/078* (2006.01)

(52) U.S. Cl.
CPC .......... *C03C 17/3613* (2013.01); *C03C 3/078* (2013.01); *C03C 17/3626* (2013.01); *C03C 17/3639* (2013.01); *C03C 17/3644* (2013.01)

(58) Field of Classification Search
None
See application file for complete search history.

(56) References Cited

U.S. PATENT DOCUMENTS

2007/0281171 A1* 12/2007 Coster ............... B32B 17/10761 428/432
2018/0259695 A1* 9/2018 Ding .................. C03C 17/3626
2020/0017403 A1 1/2020 Disteldorf et al.

FOREIGN PATENT DOCUMENTS

DE 20 2020 100793 U1 2/2020
WO WO 2021/105424 A1 6/2021

OTHER PUBLICATIONS

International Search Report as issued in International Patent Application No. PCT/FR2022/052120, dated Mar. 7, 2023.

* cited by examiner

*Primary Examiner* — Kim S. Horger
(74) *Attorney, Agent, or Firm* — CUSHMAN PARTNERS, LLC

(57) ABSTRACT

A material includes a transparent substrate coated with a functional coating including only two functional metal layers based on silver which are called, starting from the substrate, the first and second functional layers, and three dielectric coatings which are called, starting from the substrate, Di1, Di2 and Di3, each dielectric coating including at least one dielectric layer, such that each functional metal layer is arranged between two dielectric coatings, wherein the first dielectric coating Di1 includes a layer based on silicon zirconium nitride with a high refractive index, SixZryNz, and with an atomic ratio of Zr to the sum of Si+Zr, y/(x+y), higher than 0.20.

20 Claims, 1 Drawing Sheet

[Figure 1]
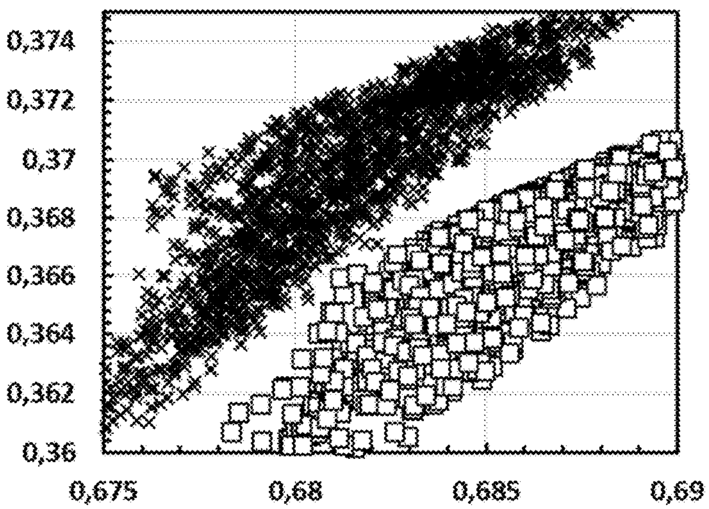
[Figure 2]
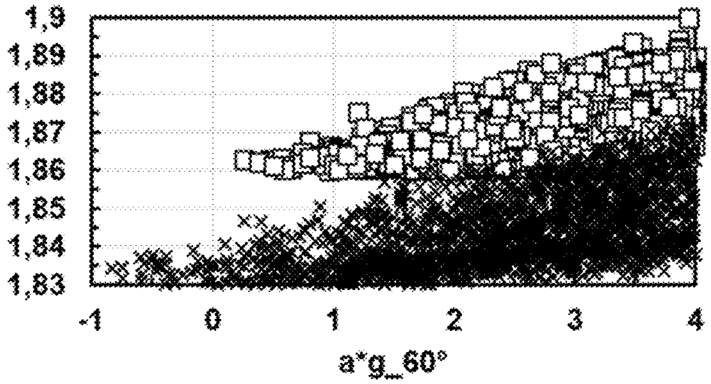
[Figure 3]
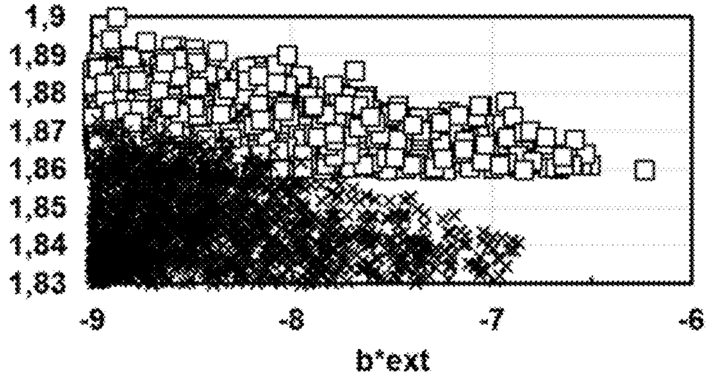

MATERIAL COATED WITH A FUNCTIONAL COATING COMPRISING A HIGH-INDEX LAYER

CROSS-REFERENCE TO RELATED APPLICATIONS

This application is the U.S. National Stage of PCT/FR2022/052120, filed Nov. 18, 2022 which in turn claims priority to French patent application number 2112288 filed Nov. 19, 2021. The content of these applications are incorporated herein by reference in their entireties.

The invention relates to a material comprising a transparent substrate coated with a functional coating which can influence solar radiation and/or infrared radiation. The invention also relates to the glazings comprising these materials and also to the use of such materials for manufacturing thermal insulation and/or solar protection glazings. In the following description, the term “functional” as used in “functional coating” means “capable of acting on solar radiation and/or infrared radiation”.

These glazings are intended to equip either buildings or vehicles, especially in order to:

- reduce climate control effort and/or prevent excessive heating, glazings so-called “solar control,” and/or
- reduce the amount of energy dissipated to the exterior, glazings so-called “low-emissivity.”

The selectivity “S” enables the performance of these glazings to be evaluated. It corresponds to the ratio of light transmission $TL_{vis}$ in the visible range of the glazing to the solar factor SF of the glazing ($S=TL_{vis}/SF$). Solar factor “SF or g” is understood to mean the ratio in % of the total energy entering the premises through the glazing to the incident solar energy. The solar factor therefore measures the contribution of a glazing to the heating of the “rom”. The smaller the solar factor, the smaller the solar inputs.

Known selective glazings comprise transparent substrates coated with a functional coating comprising a stack of one or more metallic functional layers, each arranged between two dielectric coatings. Such glazings make it possible to improve solar protection while retaining a high light transmission. These functional coatings are generally obtained by a sequence of depositions carried out by cathode sputtering, optionally assisted by a magnetic field.

Frequently, such materials must undergo heat treatments, intended to improve the properties of the substrate and/or of the stack of thin layers. In the case of glass substrates, these may for example be thermal tempering treatments intended to mechanically strengthen the substrate by creating strong compressive stresses at its surface. Such treatments can modify certain properties of the stack, in particular the thermal performance, the optical properties and the electrical properties.

The invention relates most particularly to materials coated with a functional coating comprising only two silver-based functional layers having to undergo a high-temperature heat treatment such as annealing, bending and/or tempering and having:

- a high light transmission, preferably greater than 60%, or even 70%, and
- a low solar factor, in particular of about 35%.

Materials comprising two silver-based functional layers allow glazings to be obtained which have light transmission and solar factor values in the desired ranges.

However, the aesthetic appearance of such glazings is not satisfactory. Material with high light transmission and high selectivity is obtained to the detriment of the aesthetic properties. Indeed, the increase in selectivity is generally accompanied by a decrease in the b* values in external reflection. The material thus obtained appears more or too blue. The increase in selectivity may also lead to an increase in the a* values in reflection measured on an angle at 60°. The material then appears more red when seen at an angle.

The known materials with high light transmission therefore have the following drawbacks:

- either the solar protection is insufficient, which results in too high solar factor values and too low a selectivity,
- or the colors are unsatisfactory in reflection or at an angle.

This means that these materials, which have both high light transmission, of about 70%, and a low solar factor, of about 35%, are too blue in external reflection and too red in reflection seen at an angle.

The objective of the invention is to develop a new material with high light transmission having improved solar protection without lowering the light transmission and without changing the appearance. Improved solar protection corresponds in particular to a reduction in the solar factor. A reduction in the solar factor of 1 percentage point, even 0.5 points, constitutes a significant improvement.

The applicant has surprisingly discovered that the choice of a high-refractive-index layer based on silicon nitride and zirconium nitride comprising particular proportions of these two elements, located in the dielectric coating in contact with the substrate, makes it possible to obtain a significant reduction in the solar factor without deteriorating the aesthetic appearance. The surprising effect of the invention is that this layer positioned precisely at this location of the functional coating makes it possible to lower the solar factor with iso-colorimetry, that is to say without significantly changing the perception of colors, in particular in reflection and in reflection and at an angle.

The invention therefore relates to a material comprising a transparent substrate coated with a functional coating comprising only two silver-based functional metallic layers referred to, starting from the substrate, as first and second functional layers and with three dielectric coatings, referred to, starting from the substrate, as Di1, Di2 and Di3, each dielectric coating comprising at least one dielectric layer, so that each functional metallic layer is positioned between two dielectric coatings, characterized in that:

- the first dielectric coating Di1 comprises a layer based on silicon zirconium nitride with a high refractive index, $Si_xZr_yN_z$, and with an atomic ratio of Zr to the sum of Si+Zr, $y/(x+y)$, higher than 0.20.

According to advantageous embodiments, the high refractive index silicon zirconium nitride-based layer $Si_xZr_yN_z$ has an atomic ratio of Zr to the sum Si+Zr, $y/(x+y)$ of between 0.20 and 0.50, of between 0.20 and 0.34 or of between 0.25 and 0.30.

The properties of the silver-based stacks, such as energy or optical performance, result from precise control of the effects of the optical interference between the various layers making up the stack. The specific choice of the layer based on silicon zirconium nitride of the invention at this location makes it possible to obtain a range of glazing with high light transmission and selectivity and with iso-colorimetry.

According to the intended applications and in particular according to the desired properties, these glazings may be in the form of a monolithic glazing, a multiple glazing, a laminated glazing or a multiple and laminated glazing.

Conventionally, the faces of a glazing are designated starting from the exterior of the building and by numbering the faces of the substrates from the outside towards the inside of the passenger compartment or of the premises which it equips. This means that the incident sunlight passes through the faces in increasing numerical order.

The best performing known selective glazings are generally double glazings comprising afunctional coating located on face 2, that is to say on the outermost substrate of the building, on its face turned toward the interlayer gas gap.

The materials according to the invention mounted in double glazing form with the functional coating positioned on face 2 have a high selectivity, in particular greater than 1.70, greater than 1.75, greater than 1.80, greater than 1.85.

The solution of the invention makes it possible to increase the selectivity while keeping the light transmission constant and without changing the appearance relative to the same coating without this high-index layer.

The material according to the invention has the following characteristics:

- a light transmission greater than 60%, or even greater than 65% and better still of about 70%, and/or
- an interior light reflection of less than 15%, less than 10% or less than 8% and/or
- an external light reflection of less than 15% or less than 10%.

These values are obtained for the material alone. A material alone corresponds to a monolithic glazing.

According to advantageous embodiments, the glazing of the invention in the form of a double glazing comprising the functional coating positioned on face 2, in particular

- a light transmission greater than 60%, greater than 65%, greater than 68%, between 60% and 75% or between 65% and 75% and/or
- an exterior side reflection of less than 25%, less than 20%, less than 15%.

The invention also relates:

- to a glazing comprising a material according to the invention,
- a glazing comprising a material according to the invention mounted on a vehicle or on a building, and
- to the process for preparing a material or a glazing according to the invention,
- to the use of a glazing according to the invention as solar-control and/or low-emissivity glazing for buildings or vehicles,
- to a building, vehicle or device comprising a glazing according to the invention.

The preferred features which appear in the remainder of the description are applicable as well to the material according to the invention as, where appropriate, to the glazing, the method, the use, the building or the vehicle according to the invention.

All the light characteristics presented in the description are obtained according to the principles and methods described in the European standard EN 410 relating to the determination of the light and solar characteristics of the glazings used in glass for the construction industry.

Conventionally, the refractive indices are measured at a wavelength of 550 nm.

Unless otherwise mentioned, the thicknesses mentioned in the present document, without other information, are real or geometrical physical thicknesses denoted Ep and are expressed in nanometers (and not optical thicknesses). The optical thickness Eo is defined as the physical thickness of the layer under consideration multiplied by its refractive index at the wavelength of 550 nm: Eo=n*Ep. As the refractive index is a dimensionless value, it may be considered that the unit of the optical thickness is that chosen for the physical thickness.

According to the invention, a dielectric coating corresponds to a sequence of layers comprising at least one dielectric layer, located between the substrate and the first functional layer (Di1), between two functional layers (Di2 or Di3) or above the final functional layer (Di4).

If a dielectric coating is composed of several dielectric layers, the optical thickness of the dielectric coating corresponds to the sum of the optical thicknesses of the different dielectric layers constituting the dielectric coating.

If a dielectric coating comprises an absorbing layer, for which the refractive index at 550 nm comprises an imaginary part of the non-zero (or non-negligible) dielectric function, for example a metal layer, the thickness of this layer is not taken into account in calculating the optical thickness of the dielectric coating.

The thicknesses of the blocking layers are not taken into account in calculating the optical thickness of the dielectric coating.

Within the meaning of the present invention, the labels "first", "second" and "third" for the functional layers or the dielectric coatings are defined starting from the substrate carrying the stack and with reference to the layers or coatings having the same function. For example, the closest functional layer to the substrate is the first functional layer, the following moving away from the substrate is the second functional layer, and so on.

The light characteristics are measured using the illuminant D65 at 2° perpendicularly to the material mounted in a double glazing (unless otherwise indicated):

- TL corresponds to light transmission in the visible range in %,
- Rext corresponds to the exterior light reflection in the visible range in %, observer on the exterior space side,
- Rint corresponds to the interior light reflection in the visible range in %, observer on the interior space side,
- a*T and b*T correspond to the colors in transmission a* and b* in the L*a*b* system,
- a*Rext and b*Rext correspond to the colors in reflection a* and b* in the L*a*b* system, observer on the exterior space side,
- a*Rint and b*Rint correspond to the colors in reflection a* and b* in the L*a*b* system, observer on the interior space side.

In the configurations in the form of double glazings (hereinafter DGUs for "double glazings"), colorimetric properties such as L*, a* and b* values and all the values and ranges of values of the optical and thermal characteristics such as selectivity, exterior or interior light reflection, the light transmission is calculated with:

- materials comprising a substrate coated with a functional coating mounted in a double glazing,
- the double glazing has a configuration: 6-16(Ar-90%)-4, that is to say a configuration made up of a material comprising a substrate of ordinary soda-lime glass type of 6 mm and another glass substrate of soda-lime glass type of 4 mm, the two substrates are separated by an interlayer gas gap formed of 90% argon and 10% air with a thickness of 16 mm,
- the functional coating is preferably positioned on face 2, that is to say on the outermost substrate of the building, on its face turned toward the interlayer gas gap.

Preferably, the material confers on the glazings incorporating it the colors in transmission and in external reflection or in internal reflection as defined hereinafter:

a*T values comprised between −10 and 0, between −7 and −2 or between −6.5 and −4.5, and/or b*T values between 0 and +10, between +1 and +7, between +3 and +5, and/or values of a*ext of between −10 and 0, between −7 and −1, between −6 and −2, between −3.5 and −1.5, and/or b*ext values of between −15 and 0, between −12 and −4, between −12 and −5, between −12 and −9.5, and/or a*int values of between −12 and 4, between −10 and 4 or between −9 and 4, and/or b*int values of between −10 and 0, between −8 and −2, between −7 and −3 or between −7 and −1.

The parameters a*60° and b*60° correspond to the colors a* and b* in the L*a*b* system at an angle of 60° relative to the normal to the plane of the glazing measured according to illuminant D65 at 2° perpendicular to the material mounted in a single glazing with the functional coating positioned on face 2.

The glazing of the invention in the form of a double glazing comprising the stack positioned on face 2 makes it possible to achieve in particular the following performances:

a solar factor g of less than or equal to 40%, of less than or equal to 38%, of less than or equal to 37%, of between 25 and 37%, of between 33% and 37%, and/or a high selectivity, in order of increasing preference, of at least 1.7, of at least 1.8, of at least 1.9, of at least 2.0, of at least 2.1.

The functional coating is deposited by magnetic-field-assisted cathode sputtering (magnetron method). According to this advantageous embodiment, all the layers of coatings are deposited by magnetic-field-assisted cathode sputtering.

The invention also relates to the method for obtaining a material and a glazing according to the invention, wherein the layers of coatings are deposited by magnetron cathode sputtering.

Unless specifically stipulated, the expressions "above" and "below" do not necessarily mean that two layers and/or coatings are positioned in contact with one another. When it is specified that a layer is deposited "in contact" with another layer or with a coating, this means that there cannot be one (or several) layer(s) inserted between these two layers (or layer and coating).

In the present description, unless otherwise indicated, the expression "based on", used to characterize a material or a layer with respect to what it contains, means that the mass fraction of the constituent that it comprises is at least 50%, in particular at least 70%, preferably at least 90%.

According to the invention:

light reflection corresponds to the reflection of solar radiation in the visible part of the spectrum, light transmission corresponds to the transmission of solar radiation in the visible part of the spectrum, light absorption corresponds to the absorption of solar radiation in the visible part of the spectrum.

Ordinary clear glass from 4 to 10 mm thick has the following light characteristics:

light transmittance between 87 and 91.5%, light reflection between 7 and 9.5%, light absorption between 0.3 and 5%.

The functional coating comprises two silver-based functional metal layers (F1 and F2), each arranged between two dielectric coatings (Di1, Di2, Di3).

The silver-based functional metal layers comprise at least 95.0%, preferably at least 96.5% and better still at least 98.0% by weight of silver, relative to the weight of the functional layer. Preferably, a silver-based functional metal layer comprises less than 1.0% by weight of metals other than silver, relative to the weight of the silver-based functional metal layer.

The thicknesses of the functional metal layers starting from the substrate can increase. In such a case, the increase in thickness between two successive functional layers is greater than 1 nm, greater than 2 nm, greater than 3 nm.

The ratio of the thickness between two successive functional layers F2/F1 is between 1.05 and 2.00 or between 1.10 and 1.50 inclusive.

The first functional layer has a thickness between 8 and 15 nm or between 9 and 13 nm. The second functional layer has a thickness between 10 and 20 nm or between 13 and 18 nm.

The functional coating comprises one or more blocking layers located in contact below and/or above one or more functional layers.

The role of the blocking layers is conventionally to protect the functional layers from a possible degradation during the deposition of the upper dielectric coating and during an optional high-temperature heat treatment of the annealing, bending and/or tempering type.

The blocking layers are chosen from:

metal layers based on a metal or a metal alloy, metal nitride layers, and metal oxynitride layers of one or more elements chosen from titanium, zinc, tin, nickel, chromium and niobium, metal oxide layers of one or more elements chosen from titanium, nickel, chromium and niobium.

The blocking layers may in particular be Ti, TiN, TiOx, Nb, NbN, Ni, NiN, Cr, CrN, NiCr, NiCrN, SnZnN layers. When these blocking layers are deposited in the metal, nitride or oxynitride form, these layers can undergo a partial or complete oxidation according to their thickness and the nature of the layers which surround them, for example, during the deposition of the following layer or by oxidation in contact with the underlying layer.

According to advantageous embodiments of the invention, the blocking layer or layers satisfy one or several of the following conditions:

each functional metal layer is in contact with at least one blocking layer chosen from a blocking underlayer and a blocking overlayer, and/or each functional metal layer is in contact with a blocking underlayer and a blocking overlayer, and/or the thickness of each blocking layer is at least 0.05 nm, or comprised between 0.05 and 2.0 nm or comprised between 0.05 and 1 nm, and/or the sums of the thicknesses of all the blocking layers is greater than or equal to 0.5 nm or greater than or equal to 0.8 nm or greater than or equal to 1.0 nm, and/or the sums of the thicknesses of all the blocking layers is less than or equal to 5.0 nm or less than or equal to 3.0 nm or less than or equal to 2.0 nm, For the blocking layers, the thicknesses correspond to the thicknesses of the layers as deposited, that is to say before heat treatment or before optional oxidation during the deposition of the overlying layer.

According to the invention, the blocking layers are considered as not forming part of a dielectric coating. This means that their thickness is not taken into account in calculating the optical or geometric thickness of the dielectric coating located in contact therewith.

"Dielectric layer" within the meaning of the present invention should be understood as meaning that, from the perspective of its nature, the material is "nonmetallic", that is, is not a metal. In the context of the invention, this term denotes a material exhibiting an n/k ratio over the entire wavelength range of the visible region (from 380 nm to 780 nm) which is equal to or greater than 5.

Preferably, each dielectric coating consists solely of one or more dielectric layers. Preferably, there is thus no absorbing layer in the dielectric coatings, in order not to reduce the light transmission.

The dielectric layers of the coatings exhibit the following characteristics, alone or in combination:

- they are deposited by magnetic-field-assisted cathode sputtering,
- they have a thickness of greater than 2 nm, preferably between 4 and 100 nm.

The dielectric layers may have different functions. By way of example, mention may be made of stabilizing layers, smoothing layers, and barrier layers.

The dielectric layers may have a barrier function. Dielectric layers having a barrier function (hereinafter barrier layer) is understood to mean a layer made of a material capable of forming a barrier to the diffusion of oxygen and water at high temperatures, originating from the ambient atmosphere or from the transparent substrate (alkalines), toward the functional layer. Such dielectric layers are selected from:

- the layers comprise silicon like the layers chosen from oxides such as $SiO_2$ and $Al_2O_3$, nitrides, such as silicon nitrides $Si_3N_4$ and aluminum nitrides AlN, and oxynitrides $SiO_xNy$, $AlO_xN_y$, optionally doped using at least one other element,
- layers based on zinc tin oxide,
- titanium oxide-based layers.

The layers comprising silicon are extremely stable to heat treatments. For example, no migrations of the elements constituting them are observed. Therefore, these elements are not likely to alter the silver layer. The layers comprising silicon therefore also contribute to the non-alteration of the silver layers.

The layers comprising silicon comprise at least 50% by weight of silicon relative to the weight of all the elements forming the layer comprising silicon, other than nitrogen and oxygen.

The layers comprising silicon may be selected from layers based on oxide, based on nitride or based on oxynitride, such as layers based on silicon oxide, layers based on silicon nitride and layers based on silicon oxynitride.

The layers comprising silicon may comprise, or consist of, elements other than silicon, oxygen and nitrogen. These elements may be selected from aluminum, boron, titanium and zirconium.

The layers comprising silicon may comprise at least 2%, at least 5%, or at least 8% by weight of aluminum relative to the weight of all the elements forming the layer comprising silicon oxide, other than oxygen and nitrogen.

The amounts of oxygen and nitrogen in a layer are determined by atomic percentages relative to the total amounts of oxygen and nitrogen in the layer in question.

According to the invention:

- the layers based on silicon oxide comprise essentially oxygen and very little nitrogen,
- the layers based on silicon nitride comprise essentially nitrogen and very little oxygen,
- the layers based on silicon oxynitride comprise a mixture of oxygen and nitrogen.

The layers based on silicon oxide comprise at least 90%, as atomic percentage, of oxygen relative to the oxygen and nitrogen in the layer based on silicon oxide.

The layers based on silicon nitride comprise at least 90%, as atomic percentage, of nitrogen relative to the oxygen and nitrogen in the layer based on silicon nitride. This means that all the layers based on silicon and zirconium according to the invention comprise at least 90%, in atomic percentage of nitrogen relative to the oxygen and the nitrogen in the layer.

The layers based on silicon oxynitride comprise 10 to 90% (limit values excluded), as atomic percentage, of nitrogen relative to the oxygen and nitrogen in the layer based on silicon oxide.

The layers based on silicon oxide are preferably characterized by a refractive index at 550 nm of less than or equal to 1.55.

The layers based on silicon nitride are preferably characterized by a refractive index at 550 nm of greater than or equal to 1.95.

The layers based on silicon oxynitride are preferably characterized by a refractive index at 550 nm which is intermediate between a non-nitrided layer of oxide and a non-oxidized layer of nitride. The layers based on silicon oxynitride preferably have a refractive index at 550 nm of greater than 1.55, 1.60 or 1.70 or of between 1.55 and 1.95, 1.60 and 2.00, 1.70 and 2.00 or 1.70 and 1.90.

These refractive indices may vary to a certain extent depending on the deposition conditions. Indeed, by altering certain parameters such as pressure or the presence of dopants, it is possible to obtain layers of greater or lesser density and therefore a variation in refractive index.

The layers based on silicon zirconium nitride SixZryNz form parts of the layers comprising silicon, in particular layers based on silicon nitride.

The refractive index of the layers based on silicon zirconium nitride increases with the increase in the proportions of zirconium in said layer.

The layers based on silicon nitride can comprise aluminum and/or zirconium. Such layers may comprise, in atomic proportion relative to the atomic proportion of Si, Zr and Al:

- 50 to 98 at %, 60 to 90 at %, 60 to 70 at % of silicon,
- 0 to 10%, 2 to 10 at % of aluminum
- 0 to 30 at %, 10 to 40 at % or 15 to 30 at % by weight of zirconium.

According to the invention, the first dielectric coating comprises a layer comprising a high-index silicon zirconium nitride SixZryNz with an atomic ratio of Zr to the sum Si+Zr, y/(x+y), greater than 0.20. Such a layer has a high refractive index, in particular greater than 2.30. According to the invention, these layers according to this definition are called high-index silicon nitride layers.

The high-index silicon zirconium nitride layers may further comprise aluminum. These layers may therefore comprise, in atomic proportion relative to the total atomic proportion of Si, Zr and Al:

- 60 to 80 at %, 65 to 70 at % of silicon,
- 0 to 10 at %, 1 to 10 at %, 2 to 7 at % of silicon,
- 20 to 40 at %, 25 to 30 at % of zirconium.

The dielectric coatings may also comprise one or more layers based on silicon zirconium nitride with a lower refractive index. For example, a layer comprising a silicon zirconium nitride SixZryNz with an atomic ratio of Zr to the sum Si+Zr, y/(x+y), of about 0.17 has a refractive index of 2.20 to 2.26.

The layers comprising silicon have a thickness:

- less than or equal to 100 nm, less than or equal to 80 nm, less than or equal to 50 nm, less than or equal to 40 nm, and/or
- greater than or equal to 2 nm, greater than or equal to 5 nm, greater than or equal to 10 nm or greater than or equal to 15 nm.

Preferably, each dielectric coating comprises a layer comprising silicon, preferably chosen from silicon-nitride-based layers.

The sum of the physical thicknesses of all the layers comprising silicon in each dielectric coating is greater than or equal to 10 nm, or even greater than or equal to 15 nm.

The sum of the physical thicknesses of all the layers comprising silicon in each dielectric coating is greater than 50%, greater than 60%, greater than 65%, greater than 70% of the total thickness of the dielectric coating.

The dielectric layers may be so-called stabilizing layers. Within the meaning of the invention, "stabilizing" means that the nature of the layer is selected so as to stabilize the interface between the functional layer and this layer. This stabilization results in the strengthening of the adhesion of the functional layer to the layers that surround it, and in fact will oppose the migration of its constituent material. The stabilizing layers are preferably layers based on zinc oxide optionally doped, for example, with aluminum. The zinc oxide is crystallized. The layer based on zinc oxide comprises, in increasing order of preference, at least 90.0%, at least 92.0%, at least 95.0%, at least 98.0% by mass of zinc relative to the mass of elements other than oxygen in the zinc oxide-based layer.

The stabilizing dielectric layer or layers can be directly in contact with a functional layer or separated by a blocking layer.

Preferably, the final dielectric layer of each dielectric coating located below a functional layer is a stabilizing dielectric layer. This is because it is advantageous to have a stabilizing layer, for example based on zinc oxide, below a functional layer as it facilitates the adhesion and the crystallization of the silver-based functional layer and increases its quality and its stability at high temperature.

It is also advantageous to have a stabilizing layer, for example based on zinc oxide, above a functional layer in order to increase the adhesion thereof and to optimally oppose the diffusion on the side of the stack opposite the substrate.

The stabilizing dielectric layer or layers can thus be above and/or below at least one functional layer or each functional layer, either directly in contact therewith or separated by a blocking layer.

Advantageously, each dielectric layer having a barrier function is separated from a functional layer by at least one dielectric layer having a stabilizing function.

The layers based on zinc oxide have, in increasing order preferably, a thickness of:

at least 3.0 nm, at least 4.0 nm, at least 5.0 nm, and/or
at most 15 nm, at most 10 nm, at most 8.0 nm.

The dielectric layers may be so-called smoothing layers. Within the meaning of the invention, a smoothing layer is a layer which makes it possible to smooth the interface between two layers. Advantageously, the smoothing layers are zinc tin-based layers. These layers can in particular be used to smooth the interface with a stabilizing layer based on zinc oxide located below a silver-based functional layer.

It appears that the zinc tin oxide layers contribute to reducing the overall roughness of the dielectric coating. These layers are particularly advantageous when they are present in the first dielectric coating. By reducing the overall roughness of this first dielectric coating, the quality of the layer of agent located directly above is improved.

The layers based on zinc oxide and tin oxide have, in increasing order preferably, a thickness of:

at least 3.0 nm, at least 4.0 nm, at least 5.0 nm, and/or
at most 20 nm, at most 15 nm, at most 10 nm.

According to advantageous embodiments, the first dielectric coating satisfies one or more of the following conditions:

it comprises a layer based on zinc oxide located below the first functional layer, and/or
the zinc oxide-based layer located below the first functional layer has a thickness greater than or equal to 3 nm or greater than or equal to 5 nm, and/or
it comprises a layer based on zinc tin oxide located below and in contact with a layer based on zinc oxide, and/or
the layer based on zinc tin oxide located below and in contact with a layer based on zinc oxide has a thickness greater than or equal to 3 nm or greater than or equal to 5 nm, and/or
it comprises a layer based on silicon oxynitride located below the layer based on high refractive index silicon zirconium nitride, preferably in contact with the substrate, and/or
it comprises a layer based on silicon nitride located below the layer based on high refractive index silicon zirconium nitride, and/or
it comprises a layer based on silicon nitride located below the layer based on high refractive index silicon zirconium nitride and a layer based on silicon oxynitride located below the layer based on silicon nitride, and/or
the layer based on high refractive index silicon zirconium nitride has a thickness of between 5 and 20 nm or between 5 and 15 nm,
the layer based on silicon nitride, having a thickness of between 5 and 20 nm, preferably between 5 and 15 nm,
the sum of the physical thicknesses of all the oxide layers separating the first functional layer from the layer from the layer based on high refractive index silicon zirconium nitride is greater than or equal to 5 nm, greater than or equal to 8 nm or greater than or equal to 10 nm.

The silicon zirconium oxynitride layers improve the ability of the coating to be deposited under difficult conditions and to prevent the appearance of defects. This layer is advantageously located in contact with the substrate.

Preferably, the dielectric coating Di2 located between the two functional layers satisfies one or more of the following conditions:

it does not comprise a layer based on high refractive index silicon zirconium nitride $Si_xZr_yN_z$ with an atomic ratio of Zr to the sum of Si+Zr, y/(x+y), higher than 0.20, and/or
it does not comprise a layer of silicon zirconium nitride, and/or
it does not comprise a dielectric layer having a refractive index greater than 2.20.

According to advantageous embodiments of the invention, the dielectric coatings of the functional coatings satisfy one or several of the following conditions:

the dielectric layers may be layers based on an oxide, a nitride or an oxynitride of one or several elements chosen from silicon, zirconium, titanium, aluminum, tin, zinc, and/or
the dielectric layers may be layers having a barrier, stabilizing or smoothing function, and/or
each dielectric coating comprises at least one dielectric layer having a barrier function, and/or
the dielectric layers having a barrier function are chosen from layers comprising silicon, in particular chosen from oxides, nitrides and oxynitrides, the layers comprising aluminum in particular chosen from oxides such as $Al_2O_3$, nitrides such as AlN and oxynitrides such as $AlO_xN_y$, the layer based on zinc tin oxide or the base layers based on titanium oxide, the layers comprising silicon optionally comprise at least one other element, such as aluminum, hafnium and zirconium, and/or each dielectric coating comprises a layer comprising silicon, at least one dielectric coating comprises at least one dielectric layer having a stabilizing function, and/or each dielectric coating comprises at least one dielectric layer having a stabilizing function, and/or the dielectric layers having a stabilizing function are preferably based on an oxide chosen from zinc oxide, tin oxide, zirconium oxide or a mixture of at least two of them, and/or the dielectric layers having a stabilizing function are preferably based on crystalline oxide, in particular based on zinc oxide, optionally doped using at least one other element, such as aluminum, and/or each dielectric coating located below a functional layer comprises a layer based on zinc oxide located below, in contact with or separated by a blocking layer from, the functional layer, and/or each dielectric coating located above a functional layer comprises a layer based on zinc oxide located above, in contact with or separated by a blocking layer from, the functional layer, and/or each functional layer is above a dielectric coating, the upper layer of which is a dielectric layer having a stabilizing function, preferably based on zinc oxide, and/or below a dielectric coating, the lower layer of which is a dielectric layer having a stabilizing function, preferably based on zinc oxide, and/or at least one dielectric coating comprises at least one dielectric smoothing layer, preferably based on zinc tin oxide, preferably located below and in contact with a stabilizing layer based on zinc oxide.

According to advantageous embodiments of the invention, the dielectric coatings satisfy one or more of the following conditions in terms of thicknesses:

the first dielectric coating Di1 has an optical thickness between 60 and 100 nm or 70 and 90 nm, the second dielectric coating Di2 has an optical thickness between 120 and 250 nm or 140 and 200 nm, the third dielectric coating Di3 has an optical thickness between 40 and 120 nm or 60 to 80 nm.

The functional coating may optionally comprise an upper protective layer. The upper protective layer is preferably the last layer of the stack, that is, the layer furthest from the substrate coated with the stack. These upper protective layers are regarded as included in the last dielectric coating. These layers generally have a thickness comprised between 1 and 10 nm, preferably 1 and 3 nm.

The protective layer may be selected from a layer of titanium, zirconium, hafnium, zinc and/or tin, this or these metals being in the metal, oxide or nitride form. Advantageously, the protective layer is a layer of titanium oxide, a layer of tin zinc oxide or a layer based on titanium zirconium oxide.

A particularly advantageous embodiment relates to a substrate coated with a stack, defined starting from the transparent substrate, comprising:

a first dielectric coating comprising at least one layer having a barrier function and one dielectric layer having a stabilizing function, optionally a blocking layer, a first functional layer, optionally a blocking layer, a second dielectric coating comprising at least one lower dielectric layer having a stabilizing function, one layer having a barrier function and one upper dielectric layer having a stabilizing function, optionally a blocking layer, a second functional layer, optionally a blocking layer, a third dielectric coating comprising at least one dielectric layer having a lower stabilizing function, one layer having a barrier function, optionally a protective layer.

The first dielectric coating Di1 may comprise, in this order:

a layer based on silicon oxynitride of 0 to 20 nm or of 8 to 18 nm, a layer based on silicon nitride of 0 to 20 nm or of 0 to 15 nm, the high refractive index silicon zirconium nitride layer, from 5 to 25 nm or from 5 to 20 nm, a layer based on zinc tin oxide from 0 to 20 nm, from 0 to 15 nm or from 3 to 12 nm, a layer based on zinc oxide of 2 to 12 nm or of 2 to 9 nm.

The second dielectric coating Di2 may comprise, in this order a layer based on zinc oxide of 2 to 12 nm or of 2 to 9 nm, a layer based on silicon nitride of 15 to 100 nm or of 55 to 75 nm, a layer based on zinc tin oxide of 0 to 20 nm or of 5 to 15 nm, a layer based on zinc oxide of 2 to 12 nm or of 2 to 9 nm.

The third dielectric coating Di3 may comprise, in this order a layer based on zinc oxide of 2 to 12 nm or of 2 to 9 nm, one or more layers based on silicon nitride, the thickness of all these layers based on silicon nitride is from 15 to 75 nm or from 20 to 45 nm, an upper protective layer of 0 to 5 nm.

All these thicknesses are physical thicknesses.

The transparent substrates according to the invention are preferably made of a rigid inorganic material, such as made of glass, or are organic, based on polymers (or made of polymer).

The organic transparent substrates according to the invention can also be made of polymer, and are rigid or flexible. Examples of polymers which are suitable according to the invention comprise, especially:

polyethylene, polyesters, such as polyethylene terephthalate (PET), polybutylene terephthalate (PBT) or polyethylene naphthalate (PEN);

polyacrylates, such as polymethyl methacrylate (PMMA);

polycarbonates;

polyurethanes;

polyamides;

polyimides;

fluorinated polymers, such as fluoroesters, such as ethylene-tetrafluoroethylene (ETFE), polyvinylidene fluoride (PVDF), polychlorotrifluoroethylene (PCTFE), ethylene-chlorotrifluoroethylene (ECTFE), fluorinated ethylene-propylene copolymers (FEP);

photocrosslinkable and/or photopolymerizable resins, such as thiolene, polyurethane, urethane-acrylate, polyester-acrylate resins, and polythiourethanes.

The substrate is preferably a sheet of glass or of glass-ceramic.

The substrate is preferably transparent, colorless (it is then a clear or extra-clear glass) or colored, for example blue, gray or bronze. The glass is preferably soda-lime-silica type but it can also be a glass of borosilicate or alumino-borosilicate type.

According to a preferred embodiment, the substrate is made of glass, especially soda-lime-silica glass, or of polymer organic material.

The substrate advantageously has at least one dimension greater than or equal to 1 m, even 2 m and even 3 m. The thickness of the substrate generally varies between 0.5 mm and 19 mm, preferably between 0.7 and 9 mm, especially between 2 and 8 mm, even between 4 and 6 mm. The substrate may be flat or curved, indeed even flexible.

The material according to the invention can be in the form of a monolithic, laminated and/or multiple glazing, in particular double glazing or triple glazing.

A monolithic glazing comprises a material according to the invention. The surface 1 is outside the building and thus constitutes the exterior wall of the glazing and surface 2 is inside the building and thus constitutes the interior wall of the glazing.

A multiple glazing comprises a material and at least one additional substrate, the material and the additional substrate are separated by at least one interlayer gas gap. The glazing provides a separation between an exterior space and an interior space.

A double glazing, for instance, comprises 4 surfaces; surface 1 is outside the building and thus constitutes the exterior wall of the glazing, surface 4 is inside the building and thus constitutes the interior wall of the glazing, surfaces 2 and 3 being inside the double glazing.

The coating is advantageously positioned on face 2, the face 1 of the glazing being the outermost face of the glazing, as usual.

The material, that is to say the substrate coated with the functional coating, can undergo a high-temperature heat treatment, such as an annealing, for example by a flash annealing, such as a laser or flame annealing, a tempering and/or a bending. The temperature of the heat treatment is greater than 400° C., preferably greater than 450° C. and better still greater than 500° C. The coated substrate of the functional coating can thus be bent and/or tempered.

The invention also relates to the method for preparing the material further comprising the step during which a heat treatment is carried out on the substrate thus coated. This heat treatment can be carried out at a temperature of greater than 300° C. or greater than 400° C., preferably greater than 500° C. The heat treatment is preferably chosen from tempering, annealing, rapid annealing treatments.

The tempering or annealing treatment is generally carried out in a furnace, respectively a tempering or annealing furnace. All of the material, including therefore the substrate, is brought to a high temperature, of at least 300° C. in the case of annealing, and of at least 500° C., or even 600° C., in the case of a tempering.

The details and advantageous characteristics of the invention emerge from the following nonlimiting examples.

EXAMPLES

In all the tables describing the optical and performance features, the following names are used:

DGU: the characteristics are measured on a double glazing of 6/12/4 structure: 6-mm glass/12-mm interlayer space filled with air/6-mm glass, the stack being positioned on face 2 (the face 1 of the glazing being the outermost face of the glazing, as usual), SGU: the parameters a*60° and b*60° are measured in a single glazing with the stack being positioned on face 2.

I. Materials and Deposition Conditions

The functional metal layers (FL) are silver (Ag) layers. The blocking layers are metallic layers made of nickel-chromium alloy (NiCr). The dielectric coatings of the functional coatings comprise barrier layers and stabilizing layers. The barrier layers are based on silicon nitride, doped with aluminum ($Si_3N_4$:Al), based on nitride of silicon and zirconium, or based on a mixed oxide of zinc and tin (SnZnOx). The stabilizing layers are made of zinc oxide (ZnO).

TABLE 1

| Name | Material | Stoichiometry | Index |
|---|---|---|---|
| SiON | Silicon oxynitride | — | 1.80 |
| SiN | Aluminum-doped silicon nitride | $Si_3N_4$:Al | 2.07 |
| SiZrN17 | Common silicon zirconium nitride | $Si_{x'}Zr_{y'}N_{z'}$ with y/(y + x) = 0.17 | 2.20-2.26 |
| SiZrN27 | Silicon zirconium nitride enriched with Zr | $Si_xZr_yN_z$ with y/(y + x) = 0.27 | 2.38-2.42 |
| ZnO | Zinc oxide | ZnO | 2.00 |
| SnZnO | Zinc tin oxide | $Sn_eZn_fO$ | 2.00 |
| TiO | Titanium oxide | $TiO_b$ | 2.44 |
| TiZrO | Titanium zirconium oxide | $Ti_cZr_dO$ | 2.20 |
| NiCr | Nickel-chromium alloy | $Ni_{0.8}Cr_{0.2}$ | — |
| Ag | Ag | | — |
| SiO | Aluminum-doped silicon dioxide | $SiO_2$:Al | 1.55 |

The conditions for deposition of the layers, which were deposited by sputtering ("magnetron cathode" sputtering), are summarized in table 2.

TABLE 2

| Layer | Target used | Deposition pressure | Gas |
|---|---|---|---|
| SiON | Si:Al (92:8% by wt) | $4.10^{-3}$ mbar | Ar 53%/O2 20%/N2 27% |
| $Si_3N_4$ | Si:Al (92:8% by wt) | 3.2 − 6.10 − 3 mbar | Ar/(Ar + N2) at 55% |
| SiZrN17 | Si:Zr:Al (78:17:5 at %) | $2.10^{-3}$ mbar | Ar/(Ar + $N_2$) at 45% |
| SiZrN27 | Si:Zr:Al (68:27:5 at %) | $2.10^{-3}$ mbar | Ar/(Ar + $N_2$) at 45% |
| ZnO | Zn:Al (98:2% by wt) | 1.8 · 10 − 3 mbar | Ar/(Ar + O2) at 63% |
| SnZnO | Zn:Sn (64:36% by wt) | $2.10^{-3}$ mbar | Ar/(Ar + $O_2$) at 50% |
| TiO | $TiO_2$ | $2.10^{-3}$ mbar | Ar/(Ar + $O_2$) at 95% |
| TiZrO | $TiZrO_4$ | $2.10^{-3}$ mbar | Ar/(Ar + $O_2$) at 95% |
| NiCr | Ni:Cr (80:20 at %) | 2-3 · $10^{-3}$ mbar | Ar at 100% |
| Ag | Ag | $8.10^{-3}$ mbar | Ar at 100% |

At. = atomic; wt: weight.

II. Functional Coatings

Functional coatings defined below are deposited on substrates made of clear soda-lime glass with a thickness of 6 m.

Tables 3 to 6 list the materials and the physical thicknesses in nanometers (unless otherwise indicated) for each layer or coating that forms the coatings as a function of their position with respect to the substrate bearing the stack (final line at the bottom of the table).

TABLE 3

| | Ref. 1 | Ref. 2 | Ref. 3 | Ref. 4 | M1 | Ref. 5 | M2 |
|---|---|---|---|---|---|---|---|
| DC: M3 | | | | | | | |
| TiZrO | 1.0 | 1.0 | 1.0 | 1.0 | 1.0 | 0.5 | 0.5 |
| Si3N4 | 20.3 | 22.1 | 22.1 | 14.0 | 22.9 | 23.4 | 23.8 |
| SiZrN27 | 0 | 0 | 0 | 14.9 | 0 | — | — |
| SiZrN17 | 9.5 | 8.5 | 8.5 | — | 8.2 | 6.9 | 6.6 |
| ZnO | 5 | 5 | 5 | 5 | 5 | 6.1 | 6.1 |
| BL: NiCr | 0.9 | 0.9 | 0.9 | 0.9 | 0.9 | 0.2 | 0.3 |
| FL: Ag2 | 14.6 | 14.5 | 14.5 | 14.7 | 14.9 | 16.1 | 17.6 |
| BL: NiCr | 0.1 | 0.1 | 0.1 | 0.1 | 0.1 | 0.2 | 0.2 |
| DC: M2 | | | | | | | |
| ZnO | 5 | 5 | 5 | 5 | 5 | 6.7 | 6.7 |
| SnZnO | 9 | 4 | 4 | 4 | 4 | 7.7 | 7.7 |
| $Si_3N_4$ | 63.2 | 70.7 | 70.7 | 69.6 | 71.7 | 63.1 | 65.9 |
| ZnO | 6 | 6 | 6 | 6 | 6 | 6.6 | 6.6 |
| BL: NiCr | 0.1 | 0.1 | 0.1 | 0.1 | 0.1 | 0.4 | 0.1 |
| FL: Ag1 | 11.4 | 12.2 | 12.2 | 12.0 | 12.8 | 8.7 | 10.7 |
| BL: NiCr | 0.5 | 0.5 | 0.5 | 0.5 | 0.5 | 0.5 | 0.3 |
| DC: M1 | | | | | | | |
| ZnO | 5 | 5 | 5 | 5 | 5 | 5 | 5 |
| SnZnO | 7 | 7 | 7 | 7 | 4.7 | 5.8 | 4.3 |
| TiO*x* | — | — | 15 | — | — | — | — |
| SiZrN 27% | — | — | — | — | 16 | — | 11 |
| SiZrN 17% | 9 | 15.6 | — | 15.9 | — | 9.1 | — |
| $Si_3N_4$ | 7 | — | — | — | — | 6.9 | 6.0 |
| SiON | 15 | 15 | 15 | 15 | 15 | 12 | 12 |
| Substrate (mm) | 6 | 6 | 6 | 6 | 6 | 6 | 6 |

BL: Blocking layer; FL: Functional layer; DC: Dielectric coating.

TABLE 4

| | Ref. Ex | M.Ex |
|---|---|---|
| DC: M3 | | |
| TiZrO | 1 | 1 |
| Si3N4 | 15-30 | 15-30 |
| SiZIN17 | 5-12 | 5-12 |
| ZnO | 5 | 5 |
| BL: NiCr | 0.9 | |
| FL: Ag2 | 13-18 | |
| BL: NiCr | 0.1 | 0.1 |
| DC: M2 | | |
| ZnO | 5 | 5 |
| SnZnO | 4 | 4 |
| $Si_3N_4$ | 69.5-72.9 | 70-73 |
| ZnO | 6 | 6 |
| BL: NiCr | 0.1 | 0.1 |
| FL: Ag1 | 8-13 | 8-13 |
| BL: NiCr | 0.5 | 0.5 |
| DC: M1 | | |
| ZnO | 5 | 5 |
| SnZnO | 0-9 | 0-9 |
| TiOx | | |
| SiZrN 27% | — | 6-16 |
| SiZrN 17% | 6-16 | — |
| $Si_3N_4$ | 0-20 | 0-20 |
| SiON | 15 | 15 |
| Substrate (mm) | 6 | 6 |

TABLE 5

| | M.3 | M.4 | M.5 | M.6 | M.7 | M.8 | M.9 |
|---|---|---|---|---|---|---|---|
| DC: M3 | | | | | | | |
| TiZrO | 0.3 | 0.3 | 0.3 | 0.3 | 0.3 | 0.3 | 0.3 |
| Si3N4 | 20.5 | 20.6 | 20.6 | 20.5 | 20.8 | 20.1 | 20.5 |
| SiZrN17 | 8.8 | 8.8 | 8.8 | 8.8 | 8.8 | 8.8 | 8.8 |
| ZnO | 6.1 | 6.1 | 6.1 | 6.1 | 6.1 | 6.1 | 6.1 |
| BL: NiCr | 0.26 | 0.26 | 0.26 | 0.26 | 0.26 | 0.26 | 0.26 |
| FL: Ag2 | 15.5 | 15.7 | 15.6 | 15.6 | 15.6 | 15.3 | 15.5 |
| BL: NiCr | 0.26 | 0.26 | 0.26 | 0.26 | 0.26 | 0.26 | 0.26 |
| DC: M2 | | | | | | | |
| ZnO | 6.7 | 6.7 | 6.7 | 6.7 | 6.7 | 6.7 | 6.7 |
| SnZnO | 7.7 | 7.7 | 7.7 | 7.7 | 7.7 | 7.7 | 7.7 |
| $Si_3N_4$ | 65.3 | 65.5 | 65.5 | 65.5 | 65.7 | 64.8 | 65.3 |
| ZnO | 6.6 | 6.6 | 6.6 | 6.6 | 6.6 | 6.6 | 6.6 |
| BL: NiCr | 0.23 | 0.23 | 0.23 | 0.23 | 0.23 | 0.23 | 0.23 |
| FL: Ag1 | 11.9 | 11.8 | 11.9 | 11.8 | 11.9 | 11.9 | 11.9 |
| BL: NiCr | 0.63 | 0.63 | 0.63 | 0.63 | 0.63 | 0.63 | 0.63 |
| DC: M1 | | | | | | | |
| ZnO | 5.0 | 5.0 | 5.0 | 5.0 | 5.0 | 5.0 | 5.0 |
| SnZnO | 5.8 | 5.8 | 8.9 | 5.8 | 5.8 | 5.8 | 5.8 |
| Si3N4 | — | — | — | — | — | — | 10.8 |
| SiZrN 27% | 9.0 | 11.0 | 11.0 | 9.0 | 9.0 | 9.0 | 9.0 |
| SiZrN 17% | — | — | — | — | — | — | — |
| $Si_3N_4$ | 10.8 | 8.1 | 4.6 | 10.9 | 11.0 | 10.2 | — |
| SiON | 12 | 12 | 12 | 12 | 12 | 12 | 12 |
| Substrate (mm) | 6 | 6 | 6 | 6 | 6 | 6 | 6 |

TABLE 6

| | M.10 | M.11 | M.12 | M.13 |
|---|---|---|---|---|
| DC: M3 | | | | |
| TiZrO | 0.3 | 0.3 | 0.3 | 0.3 |
| Si3N4 | 20.5 | 20.5 | 20.5 | 20.5 |
| SiZrN27 | 0 | 0 | 0 | 11 |
| SiZrN17 | 8.8 | 8.8 | 8.8 | — |
| ZnO | 6.1 | 6.1 | 6.1 | 6.1 |
| BL: NiCr | 0.26 | 0.26 | 0.26 | 0.26 |
| FL: Ag2 | 15.5 | 15.5 | 15.5 | 15.5 |
| BL: NiCr | 0.26 | 0.26 | 0.26 | 0.26 |
| DC: M2 | | | | |
| ZnO | 6.7 | 6.7 | 6.7 | 6.7 |
| SnZnO | 7.7 | 7.7 | 7.7 | 7.7 |
| $Si_3N_4$ | 65.3 | 65.3 | 65.3 | 65.3 |
| ZnO | 6.6 | 6.6 | 6.6 | 6.6 |
| BL: NiCr | 0.23 | 0.23 | 0.23 | 0.23 |
| FL: Ag1 | 11.9 | 11.9 | 11.9 | 11.9 |
| BL: NiCr | 0.63 | 0.63 | 0.63 | 0.63 |
| DC: M1 | | | | |
| ZnO | 5.0 | 5.0 | 5.0 | 5.0 |
| SnZnO | 0 | 0 | 5.8 | 5.8 |
| SiZrN 27% | 16 | 11 | 16 | 11 |
| SiZrN 17% | — | — | — | — |
| $Si_3N_4$ | — | 10 | — | — |
| SiON | 12 | 12 | 0 | 12 |
| Substrate (mm) | 6 | 6 | 6 | 6 |

The substrates are subjected to a heat tempering under the following conditions: heat treatment at a temperature of 650° C. in the Naber furnace for 10 minutes.

Example Ref. 3 comprising a layer of titanium oxide with a high refractive index in Di1 is unsatisfactory after heat treatment. It appears hazy. This shows that it is not sufficient to have a layer with a high refractive index. All the materials having this feature do not make it possible to obtain the advantageous results of the invention.

III. Impact of Introducing the Layer of High-Index SIZrN in Di1

First Results: Optical Simulation

The first tests consisted in comparing:

- a stack with Di1 without a layer of silicon zirconium nitride (Ref. 1)
- a stack with Di1 comprising a layer of silicon zirconium nitride, the atomic proportions of zirconium with respect to zirconium and silicon are not greater than 20% (Ref. 2),
- a stack with Di1 without a layer of silicon zirconium nitride and a final dielectric coating Di3 comprising a layer of high refractive index silicon zirconium nitride (Ref. 4),
- a stack with Di1 comprising a layer of silicon zirconium nitride according to the invention (M1).

The objective of these simulations is to obtain the best achievable selectivity values while retaining acceptable aesthetic properties.

The optical thicknesses of the three dielectric coatings are substantially the same.

TABLE 7

| | | Ref. 1 | Ref.2 | Ref.4 | M.1 |
|---|---|---|---|---|---|
| DGU | TL % | 68.8 | 68.2 | 68.2 | 68.6 |
| | a*T | −4.1 | −4.4 | −4.7 | −4.9 |
| | b*T | 2.8 | 3.4 | 3.0 | 3.9 |
| | Rext % | 12.9 | 12.4 | 12.4 | 12.5 |
| | a*Rext | −3.8 | −4.0 | −2.1 | −4.1 |
| | b*Rext | −11.1 | −9.0 | −8.9 | −9.0 |
| | Rint% | 14.4 | 14.5 | 13.9 | 14.5 |
| | a*Rint | −5.6 | −6.0 | −6.9 | −4.7 |
| | b*Rint | −3.4 | −5.2 | −0.7 | −6.1 |
| | FS | 37.5 | 36.8 | 36.7 | 36.4 |
| | S | 1.83 | 1.85 | 1.86 | 1.89 |
| SGU | a*60° | 3.0 | 3.0 | 2.9 | 3.0 |
| | B*60 | −13.0 | −13.1 | −11.4 | −13.2 |

The comparison of M1 with Ref. 1 and Ref. 2 shows the advantageous effect of inserting a high index silicon zirconium nitride-based layer in the first dielectric coating relative to a functional coating without a high index silicon zirconium nitride layer.

The use of a high index silicon nitride-based layer makes it possible to considerably improve the performance and to obtain in particular a material, in the form of a double glazing, having a light transmission of 68.6% and a solar factor of 36.4% (selectivity of 1.88). These improvements are obtained without changing the appearance of the material. The colors are close in reflection and in angle reflection. In addition, the reflection levels are also unchanged (no increase).

Introducing the high-index layer according to the invention makes it possible to increase the selectivity without modifying the aesthetic appearance of the glazing.

It is noted that the advantageous effect is not obtained when the high-index layer is added to another dielectric coating. Example Ref. 4 shows a lower light transmission and a higher solar factor than the example according to the invention M.1. The selectivity is not satisfactory.

Real Tests

On the basis of these optical simulations, tests were carried out to confirm the gain in selectivity provided by the introduction of a layer of SiZrN with a high refractive index. A readjustment of the thicknesses of each silver layer as well as of the thickness of the dielectric coatings was carried out in addition to the insertion of the layer of high refractive index silicon zirconium nitride in the first dielectric coating. This gives the materials Ref. 5 and M.2.

TABLE 8

| | Ref.5 | M.2 |
|---|---|---|
| TL % | 69.0 | 68.3 |
| a*T | −5.7 | −5.6 |
| b*T | 1.2 | 3.9 |
| Rext % | 12.4 | 14.4 |
| a*Rext | −1.3 | −2.8 |
| b*Rext | −9.7 | −11.1 |
| Rint% | 13.6 | 16.2 |
| a*Rint | 3.0 | −0.6 |
| b*Rint | −2.5 | −6.8 |
| FS | 38.5 | 36.6 |
| s | 1.79 | 1.87 |
| a*60 | 1.9 | 2.0 |
| b*60 | −10 | −10.1 |

The optimization leads to a high reduction in the solar factor and a gain in selectivity of at least 0.5 for comparable colors and transmission and for each of the reflections. These measurements confirm the improvement predicted by the simulations.

IV. Variation of the Selectivity with the Aesthetic Properties

The preceding examples have shown the benefit of introducing the layer of high refractive index silicon zirconium for a few sets of thicknesses of functional coatings.

In order to show the gain in selectivity, for a given aesthetic and for a large number of adjustments of the thickness of layers in the functional coating, virtual scans were carried out by optical simulation.

In the context of these simulations, all the layer thicknesses were varied with the exception of those of the blocking layers, zinc oxide layers, zinc tin oxide layers in Di2, silicon and zirconium oxynitride layers and upper protective layers.

The ranges of thicknesses wherein the layers varied are defined in Table 4, under Ref. Ex and M.Ex.

These scans correspond to random thickness pitches with more than 30,000 iterations in total. To ensure the comparison between the two types of coating (Ref. Ex and M. Ex) on the basis of the same aesthetic, only the results falling in the color box (Table 9, "colorbox") defined below are retained.

TABLE 9

| 6*/16/4 | a*T | b*T | a*Rext | b*Rext | a*Rint | b*Rint |
|---|---|---|---|---|---|---|
| Min | −5.5 | 2.5 | −5.0 | −9.0 | −8.0 | −6.0 |
| Max | −3.5 | 4.0 | −2.5 | −6.0 | −3.5 | −4.0 |

The results of these Brownian scans are depicted by FIGS. 1, 2 and 3, comprising filtering on the conditions having the highest selectivity levels. In each of these figures, the cross cloud depicts the result of the scans for the functional coating Ref. Ex and the square cloud depicts the result of the scans for the functional coating according to the invention M. Ex.

FIG. 1 depicts the light transmission as a function of the solar factor.

FIGS. 2 and 3 respectively depict the values of a*Rext at angle at 60° and b*Rext as a function of the selectivity.

In FIG. 1, the square cloud is located lower than the cross cloud. This clearly shows the gain in selectivity obtained according to the invention. The M. Ex square cloud is almost 1% lower in solar factor for the same light transmission value. This is to say that for a given light transmission, with the M. Ex. scans glazing units are obtained which have a solar factor having 1 less point of solar factor than those of the same light transmission obtained with the Ref. Ex scans. For a given light transmission, the materials according to the invention average a solar factor of 1 lower point.

FIGS. 2 and 3 show the compromise that must be made between obtaining high selectivity and colorimetry. The higher the selectivity is:

- the more the values of a*Rext at an angle at 60° tend towards high positive values.
- the more the values of b*Rext tend toward negative values.

In the case of the invention, these two compromises are significantly shifted toward higher selectivity values. This is to say that for a selectivity value, the values of a*ext at 60° are much closer to 0 in the case of M.Ex. than Ref. Ex and the values of b*Rext at 60° are much closer to 0 in the case of M.Ex. This clearly confirms the positive impact of the invention on obtaining the best compromise between high light transmission, high selectivity, low solar factor and aesthetic preservation.

The major advantage of the invention is that solar protection performance and sufficiently high transmission values are not obtained to the detriment of the satisfactory visual appearance.

Independently of the optimization of the selected stack or target colors, the selectivity is always improved when the functional coating comprises a layer of silicon zirconium with high refractive index in the first dielectric coating.

In a double glazing configuration, the solar factor and transmission gain may range up to 1%.

V. Alternative

Addition of a Layer of Silicon Nitride in Di1 Between the Substrate and the High-Index Silicon Zirconium Nitride Layer In the examples according to the invention M3 to M8, a "thick" layer of silicon zirconium nitride is replaced like in M1 according to the invention by two layers, a layer of silicon nitride and a layer of silicon zirconium nitride without modifying the optical thickness of the dielectric coatings. The silicon nitride layer is advantageously placed between the silicon oxynitride layer and the silicon zirconium nitride layer. The thickness of the layer of silicon nitride varies from 4 to 11 nm.

The silicon nitride layer serves as a barrier to the diffusion of the species of the substrate such as alkali metals and oxygen, in particular during high-temperature heat treatments.

It may also contribute to the creation of a refractive index gradient with less of a gap between two successive layers. This less pronounced gradient can contribute to improving performance.

Finally, the introduction of a layer of silicon nitride makes it possible to reduce the thicknesses of the layer of high refractive index silicon zirconium nitride necessary to reach the high levels of transparency targeted.

Therefore, such stacks are more versatile with regard to the configuration of the magnetron line required for their deposition or can be manufactured with a higher line speed.

The glazings M.3 to M.8 exhibit a high light transmission while retaining an acceptable appearance.

TABLE 10

| | | M.3 | M.4 | M.5 | M.6 | M.7 | M.8 |
|---|---|---|---|---|---|---|---|
| DGU | TL % | 68.4 | 68.4 | 68.5 | 68.4 | 68.4 | 68.3 |
| | a*T | −5 | −5.2 | −5.2 | −5.0 | −5.2 | −4.8 |
| | b*T | 3.0 | 3.1 | 3.3 | 3.1 | 3.4 | 2.6 |
| | Rext % | 12.2 | 12.2 | 12.1 | 12.3 | 12.3 | 12.2 |
| | a*Rext | −3.6 | −3.6 | −3.5 | −3.7 | −3.3. | −4.3 |
| | b*Rext | −9.3 | −9.2 | −9.2 | −9.4 | −10.2 | −8.0 |
| | Rint % | 13.7 | 13.7 | 13.7 | 13.8 | 13.8 | 13.8 |
| | a*Rint | −3.5 | −2.9 | −2.9 | −3.5 | −3.0 | −4.3 |
| | b*Rint | −6.5 | −6.7 | −7.0 | −6.6 | −7.2 | −5.4 |
| | FS | 36.6 | 36.5 | 36.5 | 36.6 | 36.5 | 36.7 |
| | s | 1.87 | 1.87 | 1.87 | 1.87 | 1.87 | 1.86 |
| SGU | a*60° | 3.0 | 3.0 | 3.0 | 2.6 | 2.6 | 3.0 |
| | B*60 | −13.3 | −13.1 | −13.2 | −13.4 | −13.6 | −12.9 |

Various compromises between color and selectivity can be achieved owing to the high index SiN/SiZrN combination in the first dielectric coating.

Addition of a Layer of Silicon Nitride in Di1 Between the Layer of Silicon Zirconium Nitride and the First Functional Layer It is also possible to place a layer of silicon nitride between the layer of SiZrN and the layer based on zinc tin oxide. In this position, the silicon nitride layer can prevent interactions between the SiZrN and the SnZnO during the high-temperature heat treatments. Thus, the risks of degradation of the silver layer by diffusion of species such as Sn, Zn or Zr are reduced. Example M.9 according to the invention shows this embodiment. The glazing incorporating it has a high light transmission while retaining an acceptable appearance.

Absence of SnZnO in Di1

The layers of high refractive index silicon zirconium nitride according to the invention have a low roughness when they are deposited in fine layers. They appear in particular to have a lower roughness than the traditional layers of silicon nitride.

Materials M.10 and M.11 without SnZnO in Di1 make it possible to obtain glazings with high light transmission while retaining an acceptable appearance.

Absence of Silicon Oxynitride and Zirconium Oxynitride Layer

The material M.12 produced without a layer of silicon oxynitride in Di1 makes it possible to obtain glazings with high light transmission while retaining an acceptable appearance.

Presence of a Layer of Silicon Zirconium Nitride in Di3

Example M.13 shows a material with a high index silicon zirconium nitride layer both in the first and in the last dielectric coating.

The impact of the presence of the high-index layer in Di3 is lower than that of the invention linked to the presence of the high-index layer in Di1. However, this contributes to improving the selectivity without modifying the appearance.

The invention claimed is:

1. A material comprising a transparent substrate coated with a functional coating comprising only two silver-based functional metallic layers and comprising three dielectric coatings, each dielectric coating comprising at least one dielectric layer, so that each silver-based functional metallic layer is positioned between two dielectric coatings such that the functional coating comprises, starting from the substrate, a first dielectric coating Di1, a first silver-based functional metallic coating, a second dielectric coating Di2, a second silver-based functional metallic coating and a third dielectric coating Di3, wherein the first dielectric coating Di1 comprises:

a layer based on silicon zirconium nitride with a high refractive index, $Si_xZr_yN_z$, and with an atomic ratio of Zr to the sum of Si+Zr, y/(x+y), higher than 0.20, a layer based on silicon oxynitride located below the layer based on silicon zirconium nitride with the high refractive index, and a layer based on zinc tin oxide or zinc oxide located above and in contact with the layer based on silicon zirconium nitride with the high refractive index.

2. The material according to claim 1, wherein the layer based on silicon zirconium nitride has a refractive index greater than 2.30.

3. The material according to claim 1, wherein the layer based on silicon oxynitride located below the layer based on silicon zirconium nitride with the high refractive index is in contact with the substrate.

4. The material according to claim 1, wherein the first dielectric coating Di1 comprises:

a layer based on silicon nitride located below the layer based on silicon zirconium nitride with the high refractive index, and said layer based on silicon oxynitride located below the layer based on silicon nitride.

5. The material according to claim 1, wherein each dielectric coating comprises a layer based on silicon nitride.

6. The material according to claim 5, wherein a sum of the physical thicknesses of all the layers comprising silicon in each dielectric coating Di1, Di2, Di3 is greater than 65% of a total thickness of the first, second and third dielectric coatings Di1, Di2, Di3.

7. The material according to claim 1, wherein each dielectric coating located below the first or second silver-based functional metallic layer comprises a layer based on zinc oxide located below, in contact with or separated by a blocking layer from, the first or second silver-based functional metallic layer, the layer based on zinc oxide having a thickness greater than or equal to 3 nm.

8. The material according to claim 1, wherein each dielectric coating located above the first or second silver-based functional metallic layer comprises a layer based on zinc oxide located above, in contact with or separated by a blocking layer from, the first or second silver-based functional metallic layer.

9. The material according to claim 1, wherein the first dielectric coating Di1 comprises a layer based on zinc tin oxide located below and in contact with a layer based on zinc oxide.

10. The material according to claim 1, wherein the functional coating comprises one or more blocking layers located in contact below and/or above one or more of the first and second silver-based functional metallic layers.

11. The material according to claim 10, wherein a sum of total thicknesses of all the one or more blocking layers is greater than or equal to 0.5 nm and less than or equal to 2 nm.

12. The material according to claim 1, wherein:

the first silver-based functional layer has a thickness between 8 and 15 nm, and/or the second silver-based functional layer has a thickness between 10 and 20 nm.

13. The material according to claim 1, wherein:

the first dielectric coating Di1 has an optical thickness between 60 and 100 nm, the second dielectric coating Di2 has an optical thickness between 120 and 250 nm, the third dielectric coating Di3 has an optical thickness between 40 and 120 nm.

14. A material comprising a transparent substrate coated with a functional coating comprising only two silver-based functional metallic layers and comprising three dielectric coatings, each dielectric coating comprising at least one dielectric layer, so that each silver-based functional metallic layer is positioned between two dielectric coatings such that the functional coating comprises, starting from the substrate, a first dielectric coating Di1, a first silver-based functional metallic coating, a second dielectric coating Di2, a second silver-based functional metallic coating and a third dielectric coating Di3, wherein:

the first dielectric coating Di1 comprises, in this order:

a layer based on silicon oxynitride of 0 to 20 nm, a layer based on silicon nitride of 0 to 20 nm, a high refractive index silicon zirconium nitride layer, $Si_xZr_yN_z$, of 5 to 25 nm, the high refractive index silicon zirconium nitride layer having an atomic ratio of Zr to the sum of Si+Zr, y/(x+y), higher than 0.20, a layer based on zinc tin oxide of 0 to 15 nm, a layer based on zinc oxide of 2 to 12 nm, the second dielectric coating Di2 comprises, in this order:

a layer based on zinc oxide of 2 to 12 nm, a layer based on silicon nitride of 15 to 100 nm, a layer based on zinc tin oxide of 0 to 20 nm, a layer based on zinc oxide of 2 to 12 nm, the third dielectric coating Di3 comprises, in this order:

a layer based on zinc oxide of 2 to 12 nm, one or more layers based on silicon nitride, the thickness of all these layers based on silicon nitride is from 15 to 75 nm or from 20 to 45 nm, an upper protective layer of 0 to 5 nm, all these thicknesses being physical thicknesses.

15. The material according to claim 1, wherein the substrate is made of glass or of polymer organic material.

16. The material according to claim 1, wherein the material exhibits a light transmission of greater than 60%.

17. A glazing comprising at least one material according to claim 1, wherein the glazing is a multiple glazing.

18. The material according to claim 1, wherein the glass is soda-lime-silica glass.

19. The material according to claim 14, wherein the layer based on silicon oxynitride, or the layer based on silicon nitride, or both, in the first dielectric coating Di1 have a thickness greater than 0 nm and up to 20 nm.

20. The material according to claim 19, wherein the thickness of each of the layer based on silicon oxynitride and the layer based on silicon nitride in the first dielectric coating Di1 is greater than 0 nm and up to 20 nm.

* * * * *